US012251937B2

(12) United States Patent
Ihara

(10) Patent No.: US 12,251,937 B2
(45) Date of Patent: Mar. 18, 2025

(54) PRINTING APPARATUS AND PRINTING METHOD

(71) Applicant: SEIKO EPSON CORPORATION, Tokyo (JP)

(72) Inventor: Seiji Ihara, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 169 days.

(21) Appl. No.: 18/059,295

(22) Filed: Nov. 28, 2022

(65) Prior Publication Data

US 2023/0166513 A1 Jun. 1, 2023

(30) Foreign Application Priority Data

Nov. 29, 2021 (JP) ................................ 2021-193503

(51) Int. Cl.
*B41J 2/165* (2006.01)
*B41J 2/045* (2006.01)

(52) U.S. Cl.
CPC ....... *B41J 2/16552* (2013.01); *B41J 2/04501* (2013.01); *B41J 2/1652* (2013.01); *B41J 2002/16555* (2013.01)

(58) Field of Classification Search
CPC .. B41J 2/16552; B41J 2/04501; B41J 2/1652; B41J 2002/16555; B41J 3/28; B41J 11/00244; B41J 15/04; B41J 29/377; B41J 29/38; B41J 2/16508; B41J 2/165; B41J 2/01
See application file for complete search history.

(56) References Cited

U.S. PATENT DOCUMENTS 10,035,345 B2 7/2018 Hattori et al.

FOREIGN PATENT DOCUMENTS

JP 2017-165033 A 9/2017
JP 2021142696 A * 9/2021

* cited by examiner

*Primary Examiner* — Douglas X Rodriguez
*Assistant Examiner* — Tracey M McMillion
(74) *Attorney, Agent, or Firm* — WORKMAN NYDEGGER

(57) ABSTRACT

A printing apparatus includes a platen that supports a recording medium, a printing head that reciprocates along the platen, and discharges a droplet onto the recording medium supported by the platen at least in a forward route or a backward route of the reciprocation, to perform printing, and an air blowing unit disposed on at least one of two sides of the platen in a reciprocation direction, that is a direction in which the printing head moves along with the reciprocation, and blows an airflow to a nozzle surface of the printing head that reciprocates.

10 Claims, 9 Drawing Sheets

PRINTING APPARATUS AND PRINTING METHOD

The present application is based on, and claims priority from JP Application Serial Number 2021-193503, filed Nov. 29, 2021, the disclosure of which is hereby incorporated by reference herein in its entirety.

BACKGROUND

1. Technical Field

The present disclosure relates to a printing apparatus and a printing method.

2. Related Art

JP 2017-165033 A discloses an ink jet recording device including an ink jet head. JP 2017-165033 A describes a technique for suppressing condensation on a nozzle surface, and preventing drying of the nozzle surface. In JP 2017-165033 A, a temperature/humidity acquisition unit and a temperature/humidity adjusting unit are provided, and by controlling a plurality of the temperature/humidity adjusting units based on information from the temperature/humidity acquisition unit, humidity in a vicinity of the nozzle surface of the ink jet head is kept within a predetermined range. In this way, in JP 2017-165033 A, condensation on the nozzle surface is suppressed, and drying of the nozzle surface is prevented.

In the technology described in JP 2017-165033 A, the vicinity of the nozzle surface is kept within a constant humidity range based on the information from the temperature/humidity acquisition unit, to suppress condensation on the nozzle surface, and drying of the nozzle surface is prevented. However, dehumidification and moisturization on the nozzle surface is performed during printing. Therefore, when the humidity in the vicinity of the nozzle surface rises beyond a threshold value during printing, and a possibility of condensation on the nozzle surface is detected, it is necessary to temporarily suspend the printing operation, move the nozzle surface to a position where the humidity can be adjusted, and perform dehumidification processing. The above is similarly applied to a case where the humidity in the vicinity of the nozzle surface lowers below a threshold value during printing, and moisturization is performed to prevent drying of the nozzle surface.

SUMMARY

One aspect of the present disclosure is printing apparatus that includes a support portion configured to support a recording medium, a printing head configured to reciprocate along the support portion, and discharge a droplet onto the recording medium supported by the support portion at least in a forward route or backward route of the reciprocation, to perform printing, and an air blowing unit disposed on at least one of two sides of the support portion in a reciprocation direction, that is a direction in which the printing head moves along with the reciprocation, and configured to blow an airflow to a nozzle surface of the printing head that performs the reciprocation.

Another aspect of the present disclosure is a printing method by a printing apparatus including a support portion supporting a recording medium, and a printing head reciprocating along the support portion, and discharging a droplet onto the recording medium supported by the support portion at least in a forward route or backward route of the reciprocation, to perform printing, the printing method including, on at least one of two sides of the support portion in a reciprocation direction, that is a direction in which the printing head moves along with the reciprocation, blowing an airflow to a nozzle surface of the printing head that performs the reciprocation during printing.

DESCRIPTION OF EXEMPLARY EMBODIMENTS

Hereinafter, preferred exemplary embodiments of the present disclosure will be described in detail using the figures. Note that, the exemplary embodiments described hereinafter do not limit the contents of the present disclosure as set forth in the claims. In addition, all of the configurations described below are not necessarily essential constituent requirements of the present disclosure.

1. Overview of Printing Apparatus

Figure 1:
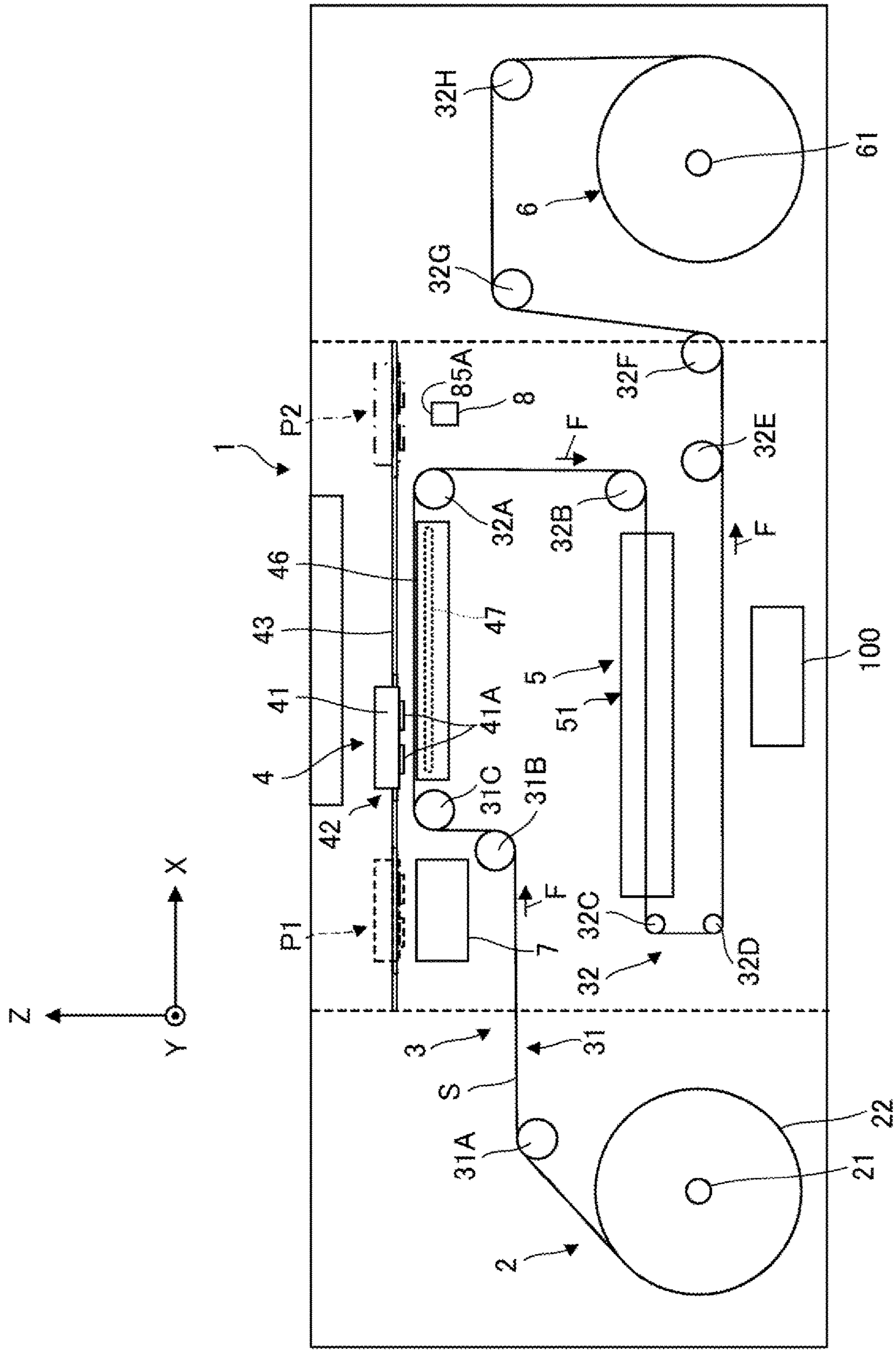
FIG. 1 is a diagram illustrating an overview of a printing apparatus according to the present exemplary embodiment.

FIG. 1 is a diagram illustrating an overview of a printing apparatus 1 according to the present exemplary embodiment.

FIG. 1 illustrates an X-axis, a Y-axis, and a Z-axis. The X-axis, the Y-axis, and the Z-axis are mutually orthogonal. The Z-axis extends in a vertical direction. The Z-axis indicates an up-down direction in an installation state of the printing apparatus 1. The X-axis extends in a horizontal direction. The X-axis indicates a left-right direction of the printing apparatus 1. The Y-axis extends in the horizontal direction. The Y-axis indicates a front-rear direction of the printing apparatus 1. The front-rear direction of the printing apparatus 1 is a width direction of a printing medium S. A positive direction indicated by an arrow of the Z-axis indicates an upward direction. A positive direction indicated by an arrow of the X-axis indicates a rightward direction. A positive direction indicated by an arrow of the Y-axis indicates a forward direction.

The printing apparatus 1 is an ink jet printer including a printing head 41, and discharges liquid ink onto the printing medium S to form an image. The printing apparatus 1 records an image by the printing head 41 on the printing medium S supported by a platen 46.

In the printing apparatus 1, various elongated sheets can be used as the printing medium S. Examples of the various sheets include paper, such as plain paper or high-quality paper, or a film made of synthetic resin. In the following description, a label sheet is exemplified as the printing medium S, and a roll-shaped label sheet is exemplified in which labels are arranged in a release paper.

The printing medium S corresponds to an example of a recording medium.

The printing apparatus 1 includes a medium supply unit 2 that supplies the printing medium S, a medium transport unit 3 that transports the printing medium S supplied from the medium supply unit 2, and a printing unit 4 that records an image on the printing medium S transported by the medium transport unit 3. Additionally, the printing apparatus 1 includes a drying unit 5 that dries the printing medium S on which an image is printed by the printing unit 4, and a medium collecting unit 6 that collects the printing medium S dried by the drying unit 5. Further, the printing apparatus 1 includes a control unit 100 that controls each unit of the printing apparatus 1.

The medium supply unit 2 is provided at a left part of the printing apparatus 1. The medium supply unit 2 includes a cylindrical or columnar feeding shaft 21. A roll body 22 in which the printing medium S is wound in a roll shape is attached to the feeding shaft 21. The printing medium S is fed from the roll body 22 by rotation of the feeding shaft 21. The feeding shaft 21 is rotated by power of a feed motor 23 illustrated in FIG. 3.

The medium transport unit 3 is provided on a right side of the medium supply unit 2. The medium transport unit 3 transports the printing medium S supplied from the medium supply unit 2 in a transport direction F. The medium transport unit 3 includes an upstream transport unit 31 disposed upstream the platen 46, and a downstream transport unit 32 disposed downstream the platen 46.

The upstream transport unit 31 includes a plurality of transport rollers 31A, 31B, and 31C. The upstream transport unit 31 transports the printing medium S fed from the medium supply unit 2 toward the platen 46.

The downstream transport unit 32 transports the printing medium S from the platen 46 toward the medium collecting unit 6. The downstream transport unit 32 includes a plurality of transport rollers 32A, 32B, 32C, 32D, 32E, 32F, 32G, and 32H. The downstream transport unit 32 includes the transport roller 32A, which is fourth, that changes the transport direction of the printing medium S from a direction along the platen 46. The fourth transport roller 32A of the present exemplary embodiment abuts on a surface of the printing medium S on a side opposite to a printing surface on which an image is recorded, and guides the printing medium S below the platen 46.

A transport path of the printing medium S is configured by the plurality of transport rollers 31A to 31C of the upstream transport unit 31, and the transport rollers 32A to 32H of the downstream transport unit 32. In the present exemplary embodiment, a predetermined roller among the transport rollers 31A to 31C, 32A to 32H of the medium transport unit 3 is configured to be driven by a transport motor 33 illustrated in FIG. 3. Here, the printing medium S is hung over the platen 46 in a state of straddling on the upstream transport unit 31 and the downstream transport unit 32, and the upstream transport unit 31 and the downstream transport unit 32, that is, the medium transport unit 3, transport the printing medium S in the X-axis direction on and along the platen 46.

The medium transport unit 3 corresponds to an example of a transport unit.

The medium transport unit 3 intermittently transports the printing medium S. That is, the medium transport unit 3 transports the printing medium S in the transport direction F by a predetermined length, and stops the printing medium S. Here, the predetermined length is a length in the X-axis direction where the printing unit 4 can perform printing. The printing unit 4 moves the printing head 41 in the Y-axis direction and the X-axis direction while the printing medium S is stopped, and prints on the printing medium S on the platen 46. When printing on the printing medium S on the platen 46 is completed by the printing unit 4, the medium transport unit 3 transports the printing medium S along the X-axis direction.

The printing unit 4 is provided above the platen 46. The printing unit 4 prints an image on a label of the printing medium S by discharging ink toward the printing medium S.

The printing unit 4 includes the printing head 41 discharging ink, and a carriage 42 holding the printing head 41.

The carriage 42 is configured to be capable of reciprocating along the platen 46. Specifically, the carriage 42 is supported by a first guide rail 43 installed in the printing apparatus 1. The first guide rail 43 extends in the X-axis direction. The carriage 42 can be reciprocated in the X-axis direction by the first guide rail 43. The first guide rail 43 extends in the X-axis direction to be longer than the platen 46, and is configured such that the carriage 42 is movable to an outer side in the X-axis direction of the platen 46. The carriage 42 is configured to be capable of reciprocating in the X-axis direction between a first end position P1 on a home side indicated by dashed lines in FIG. 1, and a second end position P2 on a separation side indicated by dot-dash lines in FIG. 1.

A second guide rail (not illustrated) that extends along the Y-axis direction is provided for the carriage 42. The printing head 41 is configured to be movable in the Y-axis direction by the second guide rail.

Figure 3:
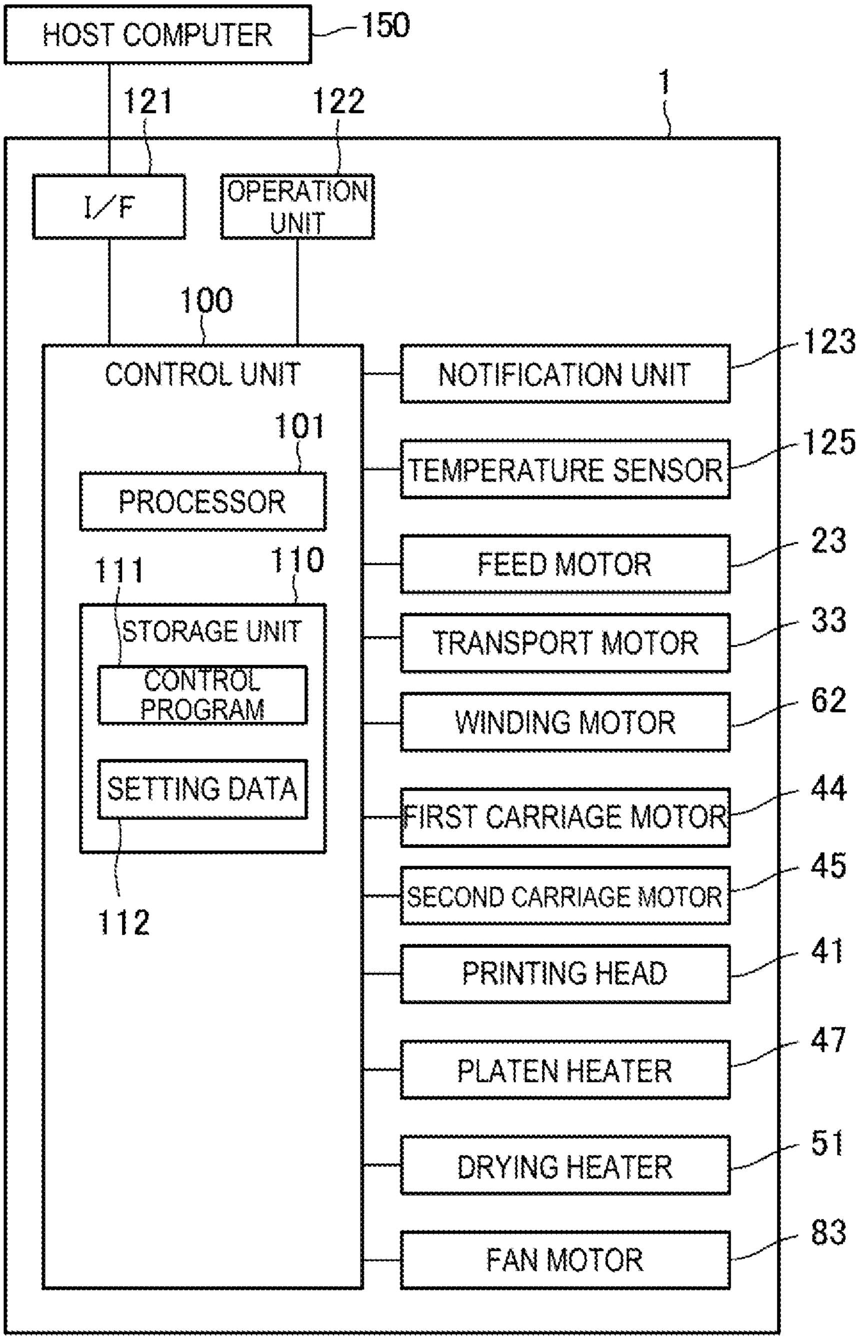
FIG. 3 is a block diagram illustrating a configuration of a main part of a control system of the printing apparatus.

The printing head 41 is moved in the X-axis direction and the Y-axis direction by a first carriage motor 44 and a second carriage motor 45 illustrated in FIG. 3.

The printing unit 4 moves the printing head 41 in the X-axis direction with respect to the printing medium S while the printing medium S is stopped. At this time, ink is discharged from the printing head 41 to print an image on the printing medium S along the X-axis direction. Here, scanning by the carriage 42 in a constant orientation in the X-axis direction is referred to as a pass. Additionally, two passes mean scanning of reciprocating once in the X-axis direction, and four passes mean scanning of reciprocating twice in the X-axis direction.

When printing along with one pass described above is completed, the printing unit 4 moves the printing head 41 by a predetermined distance in a predetermined direction in the Y-axis direction, to move the printing head 41 in the width direction of the printing medium S. Then, the printing unit 4 performs printing in a pass in which the printing head 41 is moved in an opposite direction in the X-axis direction. The printing unit 4, while the medium transport unit 3 stops transporting the printing medium S, prints on the printing medium S along with passes while being shifted a plurality of times in the Y-axis direction, to print on a region that extends in the X-axis direction and the Y-axis direction.

The printing apparatus 1 of the present exemplary embodiment is a lateral type ink jet head printer.

In the printing apparatus 1, a plurality of passes are performed, to perform printing once. Printing performed once that is performed by a plurality of passes is referred to as a frame.

In the present exemplary embodiment, a path through which the printing head 41 moves in the rightward direction in the X-axis direction corresponds to a forward route. Additionally, a path through which the printing head 41 moves in the leftward direction in the X-axis corresponds to a backward route. Ink corresponds to an example of a droplet.

The printing head 41 of the present exemplary embodiment includes a nozzle surface 41A facing the printing medium S. The nozzle surface 41A is provided with discharge ports (not illustrated) from which ink is discharged, corresponding to the number of nozzles constituting a nozzle row. The discharge port communicates with each ink chamber (not illustrated) provided in the printing head 41. The ink chamber is supplied with ink from an ink tank (not illustrated). The ink chamber is provided with a piezoelectric element (not illustrated) as a drive element.

Each piezoelectric element deforms when supplied with a voltage, and pressurizes or depressurizes a corresponding ink chamber. When an ink chamber is pressurized by a piezoelectric element, ink is discharged from a discharge port. On the other hand, when an ink chamber is depressurized by a piezoelectric element, ink is supplied from an ink tank to an ink chamber. Each piezoelectric element has a different deformation amount depending on a voltage value of an applied voltage. By appropriately controlling a voltage applied to a piezoelectric element, force for pressurizing an ink chamber, timing of pressurizing, and the like can be adjusted, and the printing apparatus 1 can change a size of ink to be discharged.

The platen 46 has a rectangular surface that is disposed so as to be parallel to the horizontal direction. The platen 46 supports the printing medium S from below.

The platen 46 corresponds to an example of a support portion.

The platen 46 includes a platen heater 47 that heats the platen 46. The platen heater 47 heats the platen 46, and thus heats the printing medium S from a surface side opposite to a surface of the printing medium S onto which ink is discharged. The printing medium S is heated during printing or before or after printing, and drying of ink landed onto the printing medium S is promoted. This evaporates liquid components such as moisture in the ink.

The platen heater 47 corresponds to an example of a heating unit.

The drying unit 5 is disposed downstream the platen 46 in a transport path. The drying unit 5 includes a drying heater 51. The drying heater 51 heats the printing medium S to cause ink adhering to the printing medium S to dry. Note that, the drying heater 51 may include, for example, a heater that heats the printing surface of the printing medium S, or a heater that heats a back surface of the printing surface.

The medium collecting unit 6 is disposed downstream the drying unit 5 in the transport path. The medium collecting unit 6 includes a winding shaft 61. The medium collecting unit 6 winds the printing medium S dried by the drying unit 5 around the winding shaft 61 for collection. The winding shaft 61 is rotated by power of a winding motor 62 illustrated in FIG. 3.

In the present exemplary embodiment, the transport rollers 31A to 31C, and 32A to 32H are all in contact with one surface of the printing medium S, and transport the printing medium S while guiding the printing medium S. However, this is an example, and the number and configuration of the transport rollers included in the medium transport unit 3 can be changed as appropriate. For example, the medium transport unit 3 may include a plurality of roller pairs that nip the printing medium S.

2. Configuration of Main Part of Printing Apparatus

A flushing mechanism 7 is disposed corresponding to the first end position P1, on a first side of two sides of the platen 46 in the X-axis direction, that is, on a left side of the platen 46. The flushing mechanism 7 includes a cap (not illustrated) through which ink is jetted from the printing head 41, and the like. The flushing mechanism 7 flushes the printing head 41. In the present exemplary embodiment, in the flushing mechanism 7, ink is jetted from the printing head 41 as the carriage 42 passes through the flushing mechanism 7. Here, the flushing is operation of forcibly discharging ink pooled in a nozzle and ejecting ink having increased viscosity, thereby preventing a discharge failure due to nozzle clogging.

An air blowing unit 8 is disposed on a second side of the two sides of the platen 46 in the X-axis direction, that is, on a right side of the platen 46. In more detail, an air blowing port 85A of the air blowing unit 8 is disposed on the right side of the platen 46. The air blowing port 85A is disposed, in the X-axis direction, on a side opposite to the platen 46, with the fourth transport roller 32A interposed therebetween. In other words, the fourth transport roller 32A is disposed between the platen 46 and the air blowing unit 8 in the X-axis direction. The fourth transport roller 32A changes the transport direction F of the printing medium S. The fourth transport roller 32A changes the transport direction F of the printing medium S in a direction in which an airflow blown by the air blowing unit 8 and traveling straight is not blocked.

The air blowing unit 8 blows an airflow to the nozzle surface 41A of the printing head 41 that reciprocates in the X-axis direction.

The X-axis direction corresponds to an example of a reciprocation direction, which is a direction in which the printing head 41 moves. The fourth transport roller 32A corresponds to an example of a transport direction changing unit.

3. Configuration of Air Blowing Unit

Figure 2:
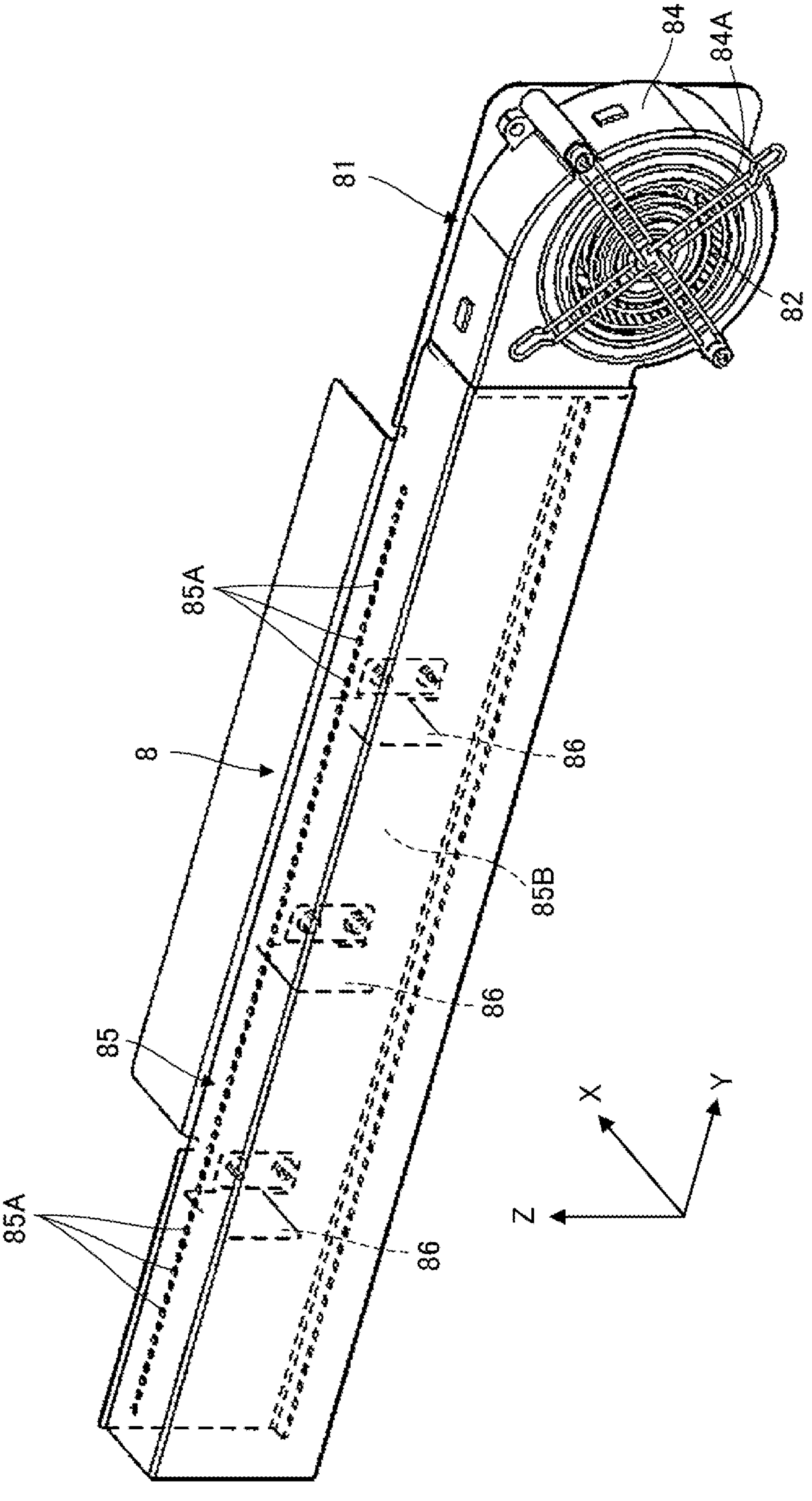
FIG. 2 is a perspective view illustrating an appearance of an air blowing unit according to the present exemplary embodiment.

FIG. 2 is a perspective view illustrating an appearance of the air blowing unit 8 according to the present exemplary embodiment.

The air blowing unit 8 includes a blower fan 81 and a duct 85 coupled to the blower fan 81.

The blower fan 81 includes a fan 82, a fan motor 83 illustrated in FIG. 3 that drives the fan 82, and a casing 84 that houses the fan 82. An inlet 84A is formed in an axial direction of the casing 84. An air outlet (not illustrated) is formed in a radial direction of the casing 84. The blower fan 81 is disposed in a state where the inlet 84A faces leftward and the air outlet faces rearward.

The duct 85 extending rearward from the air outlet and having a quadrangular cylindrical shaped cross-section is coupled to the casing 84. The duct 85 is longer than a range in the Y-axis direction in which the printing head 41 is movable. For example, the duct 85 may be longer in the front-rear direction than a front-rear width of the platen 46. A plurality of the air blowing ports 85A are formed in an upper surface of the duct 85. The air blowing ports 85A are formed side by side in the front-rear direction. The air blowing ports 85A are aligned straight in a single line.

A plurality of guide plates 86 are disposed at intervals in the front-rear direction inside the duct 85. The guide plate 86 is formed in a bent plate shape. The guide plate 86 is fixed to a duct inner wall surface 85B and extends from the duct inner wall surface 85B into the duct. The guide plate 86 guides an airflow flowing in the duct 85 toward the air blowing port 85A. The airflow guided to the air blowing port 85A is blown out through the air blowing port 85A. The plurality of guide plates 86 are configured such that an airflow blown from the blower fan 81 is blown out from the air blowing ports 85A at a substantially uniform flow rate in the front-rear direction, regardless of positions in the front-rear direction.

The air blowing port 85A is disposed at a position where the air blowing port 85A can face the nozzle surface 41A of the printing head 41. The air blowing port 85A is disposed below the first guide rail 43 on an outside in the left-right direction of the platen 46. In particular, in the present exemplary embodiment, the air blowing port 85A is disposed at a position where the printing head 41 stops when a moving direction of the printing head 41 in reciprocation is switched in the X-axis direction. Specifically, the air blowing port 85A is disposed corresponding to the second end position P2. The upper surface of the duct 85 is disposed so as to be parallel to the nozzle surface 41A.

Note that, an airflow blown out from the air blowing port 85A easily diffuses while traveling upward, and the airflow is more likely to hit the entire nozzle surface 41A of the printing head 41.

4. Configuration of Control System of Printing Apparatus

FIG. 3 is a block diagram illustrating a configuration of a main part of a control system of the printing apparatus 1.

The printing apparatus 1 includes a control unit 100 that controls each unit of the printing apparatus 1. The control unit 100 includes a processor 101 that executes a control program, and a storage unit 110. The processor 101 is an arithmetic processing device including a CPU, a DSP, a microcomputer, and the like. Additionally, the processor 101 may include a plurality of pieces of hardware, or include a single processor. Furthermore, the processor 101 may be hardware that is programmed to realize a function of each unit described below. In other words, the processor 101 may have a configuration in which a control program is mounted as a hardware circuit. In this case, for example, the processor 101 includes an ASIC or an FPGA. The processor 101 executes the control program to realize various functions of the control unit 100.

CPU is an abbreviation for Central Processing Unit. DSP is an abbreviation for Digital Signal Processor. ASIC is an abbreviation for Application Specific Integrated Circuit. FPGA is an abbreviation for Field Programmable Gate Array.

The storage unit 110 includes the control program to be executed by the processor 101, and a storage region that stores data to be processed by the processor 101. The storage unit 110 stores the control program executed by the processor 101, and setting data including various setting values related to operation of the printing apparatus 1. The storage unit 110 has a non-volatile storage region that stores the control program and the data in a non-volatile manner. Additionally, the storage unit 110 may include a volatile storage region, and constitute a printing medium S area that temporarily stores the control program executed by the processor 101, and the data to be processed.

An interface 121, an operation unit 122, and a notification unit 123 are electrically coupled to the control unit 100. Furthermore, a temperature sensor 125, the feed motor 23, the transport motor 33, the winding motor 62, the first carriage motor 44, the second carriage motor 45, and the printing head 41 are electrically coupled to the control unit 100. Further, the platen heater 47, the drying heater 51, and the fan motor 83 are electrically coupled to the control unit 100.

Figure 5:
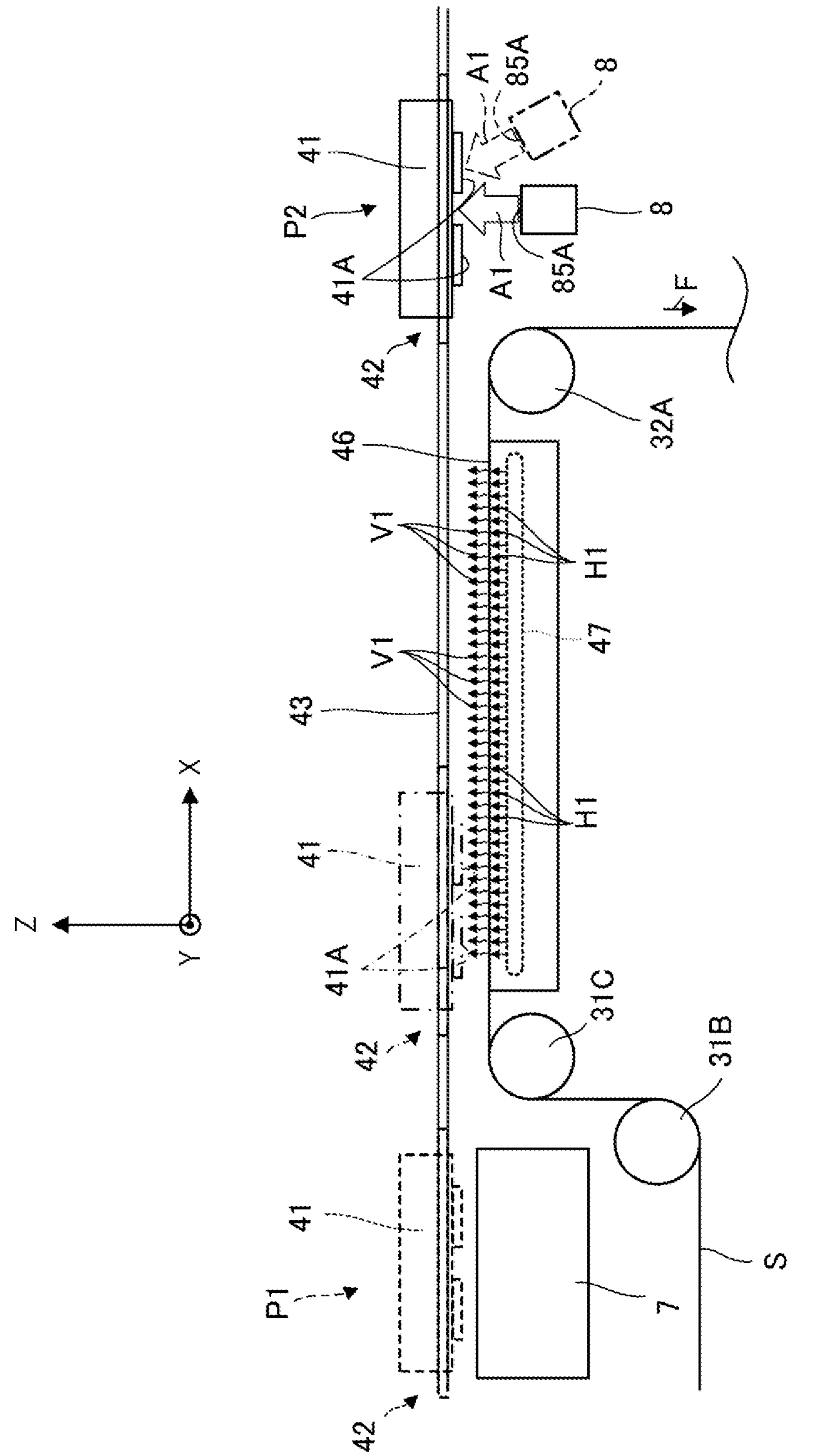
FIG. 5 is a diagram illustrating moving positions of a carriage in an X-axis direction.

Note that in FIG. 5, the interface is abbreviated as I/F.

The interface 121 is coupled to an external device of the printing apparatus 1. In the present exemplary embodiment, a host computer 150 is coupled to the interface 121. The host computer 150 outputs data of an image to be printed by the printing apparatus 1, or print data including a print instruction to the printing apparatus 1, to the printing apparatus 1, via the interface 121. The interface 121 may be, for example, a wired interface unit including a connector and an interface circuit for coupling a cable. Further, the interface 121 may be a wireless communication interface that performs wireless data communication with the host computer 150.

The operation unit 122 includes an operator or a touch panel (not illustrated) that accepts an operation by a user of the printing apparatus 1. Upon receiving an operation by a user, the operation unit 122 outputs a signal indicating the operation contents to the control unit 100.

The notification unit 123 performs notification by control of the control unit 100. The notification unit 123 includes, for example, a liquid crystal display panel, and displays characters or images indicating the notification contents. Further, the notification unit 123 may be configured to include an LED indicator, and cause the LED indicator to be turned on or to flash by control of the control unit 100. The notification unit 123 may be configured to include a speaker and a voice output circuit, and output a notification sound by control of the control unit 100.

LED is an abbreviation for Light Emitting Diode.

The temperature sensor 125 acquires an environmental temperature of an environment in which the printing apparatus 1 is disposed. The temperature sensor 125 is provided at a case wall surface of the printing apparatus 1, for example, and acquires a temperature inside a room as an environmental temperature. The temperature sensor 125 inputs the acquired environmental temperature to the control unit 100.

The feed motor 23 drives the feeding shaft 21 by control of the control unit 100.

The transport motor 33 drives a predetermined transport roller by control of the control unit 100.

The winding motor 62 drives the winding shaft 61 by control of the control unit 100.

The first carriage motor 44 is configured to be capable of driving forward and backward. The first carriage motor 44 reciprocates the carriage 42 in the X-axis direction by control of the control unit 100. The second carriage motor 45 is configured to be capable of driving forward and backward. The second carriage motor 45 moves the printing head 41 in the Y-axis direction by control of the control unit 100.

In the printing head 41, a voltage to apply to each piezoelectric element is controlled by the control unit 100, and discharging of ink, and the like, are performed.

The platen heater 47 heats the platen 46 and heats the printing medium S on the platen 46, by control of the control unit 100.

The drying heater 51 heats the printing medium S transported to the drying unit 5, by control of the control unit 100.

The fan motor 83 drives the fan 82 of the blower fan 81, by control of the control unit 100.

Figure 4:
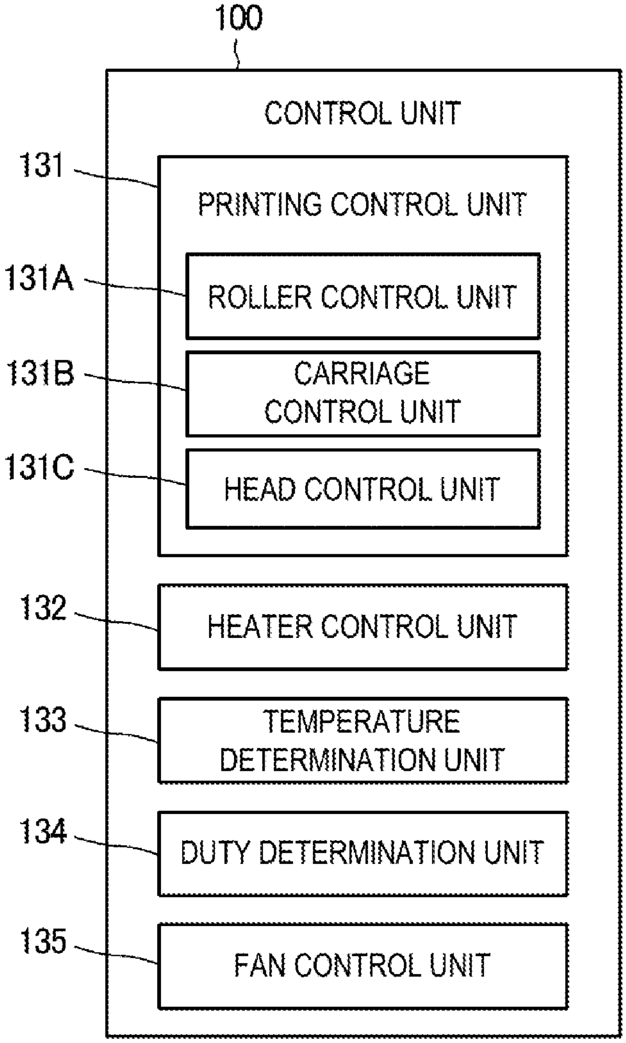
FIG. 4 is a functional block diagram of a control unit.

FIG. 4 is a functional block diagram of the control unit 100.

The control unit 100 includes a printing control unit 131, a heater control unit 132, a temperature determination unit 133, a duty determination unit 134, and a fan control unit 135. The above units 131 to 135 are realized, as described above, for example, by the processor 101 executing a control program 111, and cooperation between software and hardware.

The printing control unit 131 includes a roller control unit 131A, a carriage control unit 131B, and a head control unit 131C. The printing control unit 131 controls the feed motor 23, the transport motor 33, the winding motor 62, the first carriage motor 44, the second carriage motor 45, and the printing head 41, based on print data. In this way, the printing control unit 131 intermittently causes the printing medium S to be transported, and causes an image to be printed on the printing medium S.

The roller control unit 131A controls the feed motor 23, the transport motor 33, and the winding motor 62 to perform intermittent transport, when performing printing based on print data. In other words, the roller control unit 131A controls each of the motors 23, 33, and 62 to transport the printing medium S by a predetermined length, when printing is started. Then, when printing of a frame on the printing medium S supported by the platen 46 is ended, the roller control unit 131A controls each of the motors 23, 33, and 62 to transport the printing medium S by a predetermined length. Thus, until printing on the printing medium S is ended, the roller control unit 131A controls each of the motors 23, 33, and 62 to transport the printing medium S by a predetermined length every time the printing of the frame is ended.

FIG. 5 is a diagram illustrating moving positions of the carriage 42 in the X-axis direction.

The carriage control unit 131B controls the first carriage motor 44 and the second carriage motor 45 to move the printing head 41 of the carriage 42 in the X-axis direction and the Y-axis direction. In other words, the carriage control unit 131B controls the first carriage motor 44 and the second carriage motor 45 so that the nozzle surface 41A moves in a predetermined printing region set on the platen 46, when the printing medium S being intermittently transported is stopped.

In the present exemplary embodiment, the carriage control unit 131B drives the first carriage motor 44 when printing of a frame is started, and causes the carriage 42 to perform pass-moving from the first end position P1 to the second end position P2 in the X-axis direction. Next, the carriage control unit 131B drives the second carriage motor 45 to move the printing head 41 by a predetermined distance in a predetermined direction in the Y-axis direction. Next, the carriage control unit 131B drives the first carriage motor 44 backward to cause the carriage 42 to perform pass-moving from the second end position P2 to the first end position P1 in the X-axis direction.

Next, the carriage control unit 131B drives the second carriage motor 45 to move the printing head 41 by a predetermined distance in a predetermined direction in the Y-axis direction. Next, the carriage control unit 131B drives the first carriage motor 44 to cause the carriage 42 to perform pass-moving from the first end position P1 to the second end position P2 in the X-axis direction. In this manner, the carriage control unit 131B repeats reciprocating direction movement of the carriage 42 a predetermined number of times depending on a size of a printing region. Then, when the printing of the frame is ended, the carriage control unit 131B drives the second carriage motor 45 backward to move the carriage 42 in the Y-axis direction, to an initial position.

The head control unit 131C controls the printing head 41. The head control unit 131C of the present exemplary embodiment controls a voltage to apply to a piezoelectric element to control the printing head 41. Specifically, when the carriage 42 moves from the first end position P1 to the second end position P2, the head control unit 131C causes the printing head 41 to perform flushing, when the carriage 42 passes through the flushing mechanism 7. This suppresses discharging of thickened ink from the printing head 41, and suppresses a decrease in printing quality.

In addition, when the carriage 42 moves in a printing region, the head control unit 131C causes a predetermined amount of ink to be discharged at a predetermined position based on print data to cause the printing head 41 to perform printing.

Furthermore, when the carriage 42 moves in a non-printing region, the head control unit 131C applies a voltage having a predetermined waveform to each piezoelectric element, to cause each piezoelectric element to minute-vibrate. The minute vibration indicates applying a voltage to a piezoelectric element so as to cause the piezoelectric element to vibrate within a range where ink is not discharged from a discharge port. With this minute vibration, ink supplied to an ink chamber is agitated in accordance with the vibration of the piezoelectric element, and thickening of the ink is suppressed.

Note that, the non-printing region refers to a region, of a region extending in the X-axis direction, other than a printing region.

The heater control unit 132 controls power to supply to the platen heater 47 and the drying heater 51. Accordingly, the printing medium S is heated by the platen heater 47 and the drying heater 51 to dry ink adhering to the printing medium S.

Here, as illustrated in FIG. 5, when heat is transmitted from the platen heater 47 to the platen 46, as indicated by arrows H1, and the printing medium S on the platen 46 is heated, liquid components in ink on the printing medium S are evaporated as indicated by arrows V1. When coming into contact with the nozzle surface 41A, the evaporated liquid components may condense at the nozzle surface 41A, and adhere to the nozzle surface 41A. Then, when printing is continued as is, the liquid components further adhere to the nozzle surface 41A, and the adhering liquid components condense and diameters thereof increase, and the condensation becomes noticeable. When this state further advances, there is a possibility that the condensed liquid components prevent discharging of the ink, the discharging of the ink is destabilized, and a good printing result cannot be obtained. Thus, in the present exemplary embodiment, by blowing an airflow A1 to the nozzle surface 41A, the adhering liquid components are caused to evaporate from the nozzle surface 41A.

The temperature determination unit 133 determines whether temperature is temperature at which the liquid components of the ink easily adhere to the nozzle surface 41A or not. Specifically, the temperature determination unit 133 acquires temperature based on the temperature sensor 125. The temperature determination unit 133 determines whether the temperature from the temperature sensor 125 is less than a predetermined threshold value or not. When the temperature from the temperature sensor 125 is less than the predetermined threshold value, the temperature determination unit 133 determines that the temperature is temperature at which the liquid components of the ink easily adhere to the nozzle surface 41A. Further, when the temperature from the temperature sensor 125 is not less than the predetermined threshold value, the temperature determination unit 133 determines that the temperature is temperature at which the liquid components are unlikely to adhere to the nozzle surface 41A. The predetermined threshold value is preset according to experimentation or the like, and is stored in the storage unit 110 as setting data 112.

The duty determination unit 134 determines whether a duty in print data is a duty with which liquid components of ink easily adhere to the nozzle surface 41A or not. Specifically, the duty determination unit 134 determines whether the duty is greater than a predetermined threshold value or not. Here, the duty refers to a liquid discharge amount per unit area of the printing medium S, and is expressed as a percentage with respect to a case where a liquid discharge amount per unit area of the printing medium S when maximum dot droplets are discharged using all nozzles and printing is performed is defined as 100%. When the duty is greater than the predetermined threshold value, the duty determination unit 134 determines that the duty is a duty with which the liquid components of the ink easily adhere to the nozzle surface 41A. Further, when the duty is not greater than the predetermined threshold value, the duty determination unit 134 determines that the duty is a duty with which the liquid components of the ink are unlikely to adhere to the nozzle surface 41A. The predetermined threshold value is preset according to experimentation or the like, and is stored in the storage unit 110 as setting data 112.

Here, the duty determination unit 134 of the present exemplary embodiment determines, for a duty corresponding to one frame, whether the duty is a duty with which liquid components of ink easily adhere to the nozzle surface 41A or not. Alternatively, a configuration may be adopted in which, a duty each time pass printing is performed is determined.

The fan control unit 135 controls the blower fan 81. Specifically, the fan control unit 135 controls the fan motor 83 of the blower fan 81. Here, as in a positional relationship between the printing head 41 at the second end position P2 illustrated by solid lines in FIG. 5 and the air blowing port 85A of the air blowing unit 8, the air blowing port 85A of the air blowing unit 8 is disposed facing a movement path of the carriage 42. Therefore, during printing, the nozzle surface 41A of the printing head 41 that reciprocates in the X-axis direction passes above the air blowing port 85A. Thus, when the blower fan 81 is activated, an airflow is blown by the blower fan 81 to the nozzle surface 41A.

The fan control unit 135 of the present exemplary embodiment drives the blower fan 81, when liquid components easily adhere to the nozzle surface 41A. In other words, the fan control unit 135 controls the blower fan 81 in accordance with an environmental temperature at the start of printing, and a duty in print data. The fan control unit 135 of the present exemplary embodiment drives the blower fan 81, when a temperature is less than a threshold value, and a duty is large. Additionally, the fan control unit 135 of the present embodiment stops the blower fan 81, when a temperature is greater than a threshold value, or when a duty is less than a threshold value.

Here, when driving the blower fan 81, the fan control unit 135 controls the blower fan 81 so that a wind speed at the nozzle surface 41A falls within a predetermined range. In other words, the fan control unit 135 drives the blower fan 81 in a range with an upper limit under which the nozzle surface 41A is not excessively dried and does not affect discharging. In addition, the fan control unit 135 drives the blower fan 81 within a range with a lower limit above which an evaporative promoting effect for liquid components is obtained. Note that, in order to drive the blower fan 81 in such a range, it is sufficient to select the fan motor 8 or set parameters of the fan control unit 135, by experimentation or the like.

Accordingly, by blowing air toward the nozzle surface 41A in a non-printing region, evaporation of liquid components adhering to the nozzle surface 41A during printing is promoted, thereby suppressing advance of condensation. Therefore, stable printing is possible for a long period of time. Here, an amount of liquid components adhering to the nozzle surface 41A is influenced by a temperature difference between the evaporated liquid components and the nozzle surface 41A, and a temperature of the nozzle surface 41A depends on an environmental temperature. The fan control unit 135 of the present exemplary embodiment controls the blower fan 81 based on environmental temperature, and thus can efficiently suppress condensation of liquid components on the nozzle surface 41A. In addition, in general, when a duty is high, an ink amount discharged onto the printing medium S increases, and liquid components evaporating from the ink also increase. The fan control unit 135 of the present exemplary embodiment controls the blower fan 81 based on a duty, and thus can efficiently suppress condensation of liquid components on the nozzle surface 41A.

5. Operation of Printing Apparatus

Figure 6:
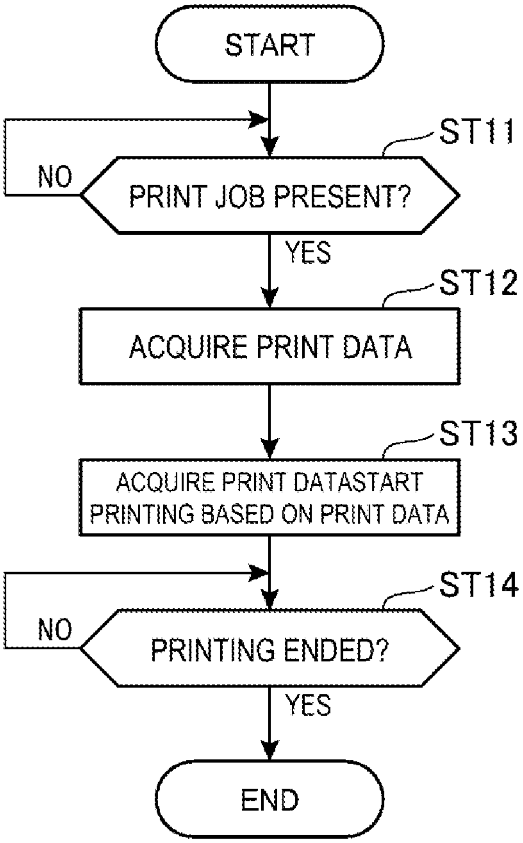
FIG. 6 is a flowchart illustrating operation of the printing apparatus.

FIG. 6 is a flowchart illustrating operation of the printing apparatus 1.

The printing apparatus 1 repeatedly performs the operation illustrated in FIG. 6 at a predetermined period, while a power supply of the printing apparatus 1 is ON.

The control unit 100 determines whether there is a print job or not (Step ST11).

When determining that there is no print job (step ST11; NO), the control unit 100 repeats the processing in step ST11 until a print job is input.

When determining that there is a print job (step ST11; YES), the control unit 100 acquires print data (step ST12).

Upon acquiring the print data, the control unit 100 starts printing operation based on the print data (step ST13). That is, the control unit 100 intermittently transports the recording medium. Further, the control unit 100 reciprocates the carriage 42, when the transport of the print medium S is stopped. Furthermore, the control unit 100 controls a piezoelectric element of the printing head 41 corresponding to a movement position of the carriage 42, and causes ink to be discharged onto the printing medium S to print an image, performs flushing, or causes minute vibration to be performed.

The control unit 100 determines whether the printing is ended or not (Step ST14).

When determining that the printing is not ended (step ST14; NO), the control unit 100 repeats the processing in step ST14 until the printing is ended.

When determining that the printing is ended (step ST14; YES), the control unit 100 ends the processing.

6. Operation of Air Blowing Unit

Figure 7:
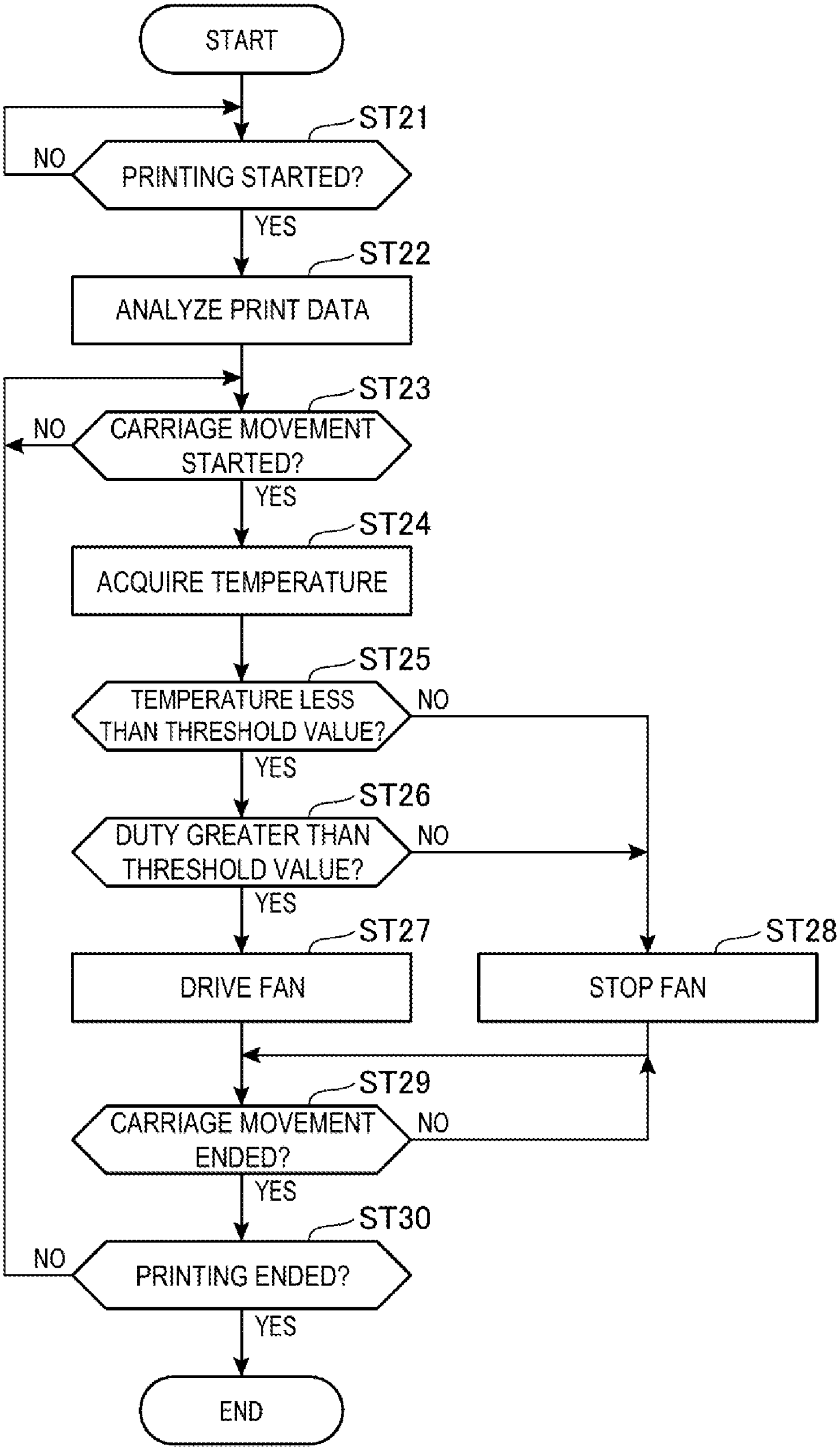
FIG. 7 is a flowchart illustrating operation of the air blowing unit.

FIG. 7 is a flowchart illustrating operation of the air blowing unit 8.

The printing apparatus 1 repeatedly performs the operation illustrated in FIG. 7 at a predetermined period, while a power supply of the printing apparatus 1 is ON.

The control unit 100 determines whether printing is started or not (step ST21). When determining that printing is not started (step ST21; NO), the control unit 100 repeats the processing in step ST21 until printing is started.

When determining that printing is started (step ST21; YES), the control unit 100 analyzes print data (step ST22). The control unit 100 acquires a duty in printing of each frame based on the print data in step ST22.

The control unit 100 determines whether movement of the carriage 42 is started or not (step ST23). That is, the control unit 100 determines whether frame printing is started or not.

When determining that movement of the carriage 42 is not started (step ST23; NO), the control unit 100 repeats the processing in step ST23 until movement of the carriage 42 is started.

When determining that movement of the carriage 42 is started (step ST23; YES), the control unit 100 acquires an environmental temperature based on the temperature sensor 125 (step ST24). Upon acquiring the environmental temperature, the control unit 100 determines whether the environment temperature is lower than a predetermined threshold value or not (step ST25).

When determining that the environment temperature is lower than the threshold value (step ST25, YES), that is, when determining that the environmental temperature is less than the threshold value, the control unit 100 determines whether a duty is greater than a predetermined threshold value or not (step ST26).

When determining that the duty is greater than the predetermined threshold value (step ST26; YES), the control unit 100 drives the blower fan 81 (step ST27). As a result, when the carriage 42 moves to a turn back position, the airflow A1 is blown to the nozzle surface 41A of the printing head 41, and liquid components adhering to the nozzle surface 41A are easily evaporated. In particular, in the present exemplary embodiment, the blower fan 81 is disposed at the second end position P2 at which the carriage 42 turns back, and the carriage 42 is more likely to stay at a position facing the air blowing port 85A for a long period of time, compared to a case where the blower fan 81 is disposed midway in the X-axis direction. Therefore, the airflow is easily blown to the nozzle surface 41A, which is suitable.

When determining that the environmental temperature is not lower than the threshold value (step ST25, NO), that is, when determining that the environment temperature is equal to or greater than the threshold value, the control unit 100 stops the blower fan 81 (step ST28).

When determining that the duty is not greater than the predetermined threshold value (step ST26; NO), the control unit 100 stops the blower fan 81 (step ST28).

When the environmental temperature is equal to or greater than the predetermined threshold value, or the duty is less than the predetermined threshold value, liquid components from ink are unlikely to adhere to the nozzle surface 41A. Therefore, even without blowing the airflow A1 to the nozzle surface 41A, the liquid components are unlikely to adhere to the nozzle surface 41A. Therefore, in the present exemplary embodiment, by stopping the blower fan 81, excessive drying of the nozzle surface 41A is prevented, and consumption of energy is suppressed.

After controlling the blower fan 81, the control unit 100 determines whether the movement of the carriage 42 is ended or not (step ST29). That is, whether the printing corresponding to one frame is ended or not is determined.

When determining that the movement of the carriage 42 is not ended (step ST29; NO), the control unit 100 repeats the processing in step ST29 until the movement of the carriage 42 is ended.

When determining that the movement of the carriage 42 is ended (step ST29; YES), the control unit 100 determines whether printing on the printing medium S is ended or not (step ST30). In other words, when the printing on the printing medium S is not ended, the printing medium S is transported by a predetermined distance, and printing of the next frame is performed. Thus, when the printing is not ended, control of the blower fan 81 for printing of the next frame is performed.

When determining that the printing is not ended (step ST30; NO), the control unit 100 returns to the processing in step ST23. When determining that the printing is ended (step ST30; YES), the control unit 100 stops the blower fan 81 when the blower fan 81 is driven, and ends the processing.

Figure 8:
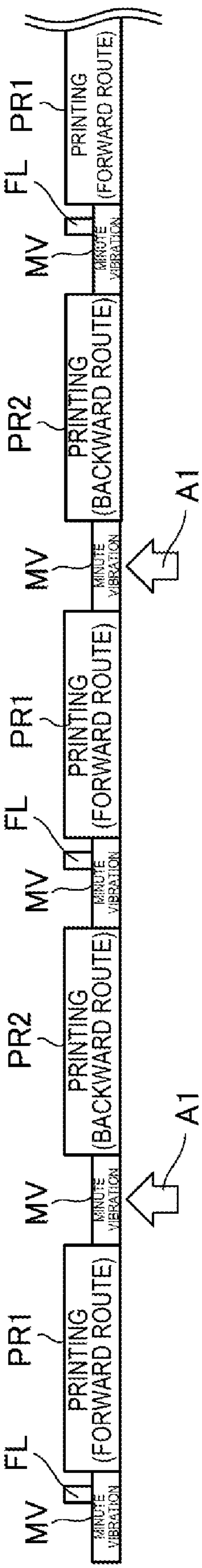
FIG. 8 is a diagram illustrating control timing of a printing head in association with reciprocation in the X-axis direction of the carriage.

FIG. 8 is a diagram illustrating control timing of the printing head 41 in association with reciprocation in the X-axis direction of the carriage 42.

In FIG. 5, and FIG. 8, when printing is performed in the printing apparatus 1, the carriage 42 reciprocates in the X-axis direction. In this case, when a non-printing region is passed through, minute vibration MV is performed, and when a printing region is passed through, image printing PR1 and image printing PR2 are performed while pass-moving is performed. Further, when movement from the first end position P1 to the second end position P2 is performed, flushing FL is performed. The above is repeatedly performed until frame printing is ended.

Here, since the air blowing unit 8 is provided at the second end position P2, the carriage 42 passes over the air blowing port 85A of the air blowing unit 8 at predetermined timing. Thus, when the blower fan 81 is driven, the nozzle surface 41A is appropriately dried by the airflow A1 blown out from the air blowing port 85A. At this time, in the present exemplary embodiment, the minute vibration MV is performed in the non-printing region, and ink in a vicinity of a meniscus of a discharge port is agitated. Thus, even when liquid components are caused to evaporate by blowing an airflow to the nozzle surface 41A, thickening of the ink caused by evaporation of the liquid components from the meniscus is easily suppressed. Thus, even when a non-discharge state of the ink continues for a long period of time, stable discharging is ensured when the discharging is resumed.

7. Actions of Exemplary Embodiment

As described above, the printing apparatus 1 according to the present exemplary embodiment includes the platen 46 that supports the printing medium S. Additionally, the printing apparatus 1 includes the printing head 41 that reciprocates along the platen 46, and in at least a forward route or a backward route of reciprocation, discharges a droplet onto the printing medium S supported by the platen 46, to perform printing. Furthermore, the printing apparatus 1 includes the air blowing unit 8 that is disposed on at least one of two sides of the platen 46 in the X-axis direction, which is a direction in which the printing head 41 moves along with reciprocation, and blows the airflow A1 to the nozzle surface 41A of the printing head 41 that reciprocates.

Therefore, it is possible to promote evaporation of liquid components of ink adhering to the nozzle surface 41A without interruption of printing. Thus, occurrence and progression of condensation at the nozzle surface 41A can be suppressed, and good print quality can be stably obtained even in continuous printing for a long period of time. In particular, since a simple configuration is adopted in which the airflow A1 is blown to the nozzle surface 41A with respect to a position where the printing head 41 moves, there is no need for complex structure or a mechanism. In addition, during operation of printing a series of frames, the airflow A1 can be blown to the nozzle surface 41A, and good printing quality can be obtained while ensuring productivity.

In the present exemplary embodiment, the air blowing port 85A of the air blowing unit 8 is disposed at a position facing the printing head 41.

Accordingly, since the configuration is adopted in which the air blowing port 85A is caused to face the printing head 41, the blower fan 81 can be separated from the printing head 41, and a degree of freedom of a layout can be increased.

In addition, in the present exemplary embodiment, the air blowing port 85A is disposed at the second end position P2 as a position where the printing head 41 stops when a movement direction of the printing head 41 in reciprocation is switched in the X-axis direction.

Here, the printing head 41 is likely to stay in the second end position P2. Therefore, as compared with a case where the air blowing port 85A is not disposed at a position where the printing head 41 is stopped when the movement direction of the printing head 41 is switched, a time for blowing an airflow to the nozzle surface 41A can be easily increased, and efficiency of evaporation promotion can be increased.

In addition, in the present exemplary embodiment, the platen 46 includes the platen heater 47 that heats the printing medium S from a surface side opposite to a surface of the printing medium S onto which a droplet is discharged.

Therefore, even when liquid components evaporate from ink on the printing medium S heated by the platen heater 47, the liquid components can be made difficult to adhere to the nozzle surface 41A. Thus, even when an amount of evaporation of the liquid components from the ink increases, it is possible to easily perform printing well, thus it is possible to easily increase an amount of heat generated by the platen heater 47.

In addition, in the present exemplary embodiment, the air blowing unit 8 is disposed on only one side of the platen 46 in the X-axis direction, and the flushing mechanism 7 that flushes the printing head 41 is disposed on another side of the platen 46 in the X-axis direction.

Accordingly, the flushing mechanism 7 and the air blowing unit 8 are provided on respective opposite sides with the platen 46 interposed therebetween in the X-axis direction, and thus ink mist generated during flushing can be prevented from being diffused inside the printing apparatus 1 by the air blowing unit 8.

In addition, in the present exemplary embodiment, the printing apparatus 1 includes the medium transport unit 3 that transports the printing medium S in the X-axis direction. Further, the printing apparatus 1 includes the fourth transport roller 32A that is disposed between the platen 46 and the air blowing unit 8 in the X-axis direction, and changes the transport direction F of the printing medium S in a direction in which the printing medium S does not block the airflow A1 blown by the air blowing unit 8.

Therefore, the airflow A1 by the air blowing unit 8 can be appropriately blown to the nozzle surface 41A.

Additionally, in the present exemplary embodiment, the control unit 100 is provided, and the control unit 100 controls the air blowing unit 8 in accordance with an environmental temperature at the start of printing.

Here, an amount of liquid components adhering to the nozzle surface 41A is influenced by a temperature difference between the evaporated liquid components and the nozzle surface 41A, and a temperature of the nozzle surface 41A depends on an environmental temperature. Therefore, since the blower fan 81 is controlled based on the environmental temperature, it is possible to efficiently suppress adhesion of liquid components on the nozzle surface 41A, while suppressing excessive drying of the nozzle surface 41A.

In addition, in the present exemplary embodiment, the control unit 100 is provided that causes the printing head 41 to perform printing based on print data, and the control unit 100 controls the air blowing unit 8 in accordance with a duty of the print data.

Here, in accordance with the duty, an amount of ink discharged onto the printing medium S increases, and liquid components evaporating from the ink also increase. Therefore, since the blower fan 81 is controlled based on the duty, it is possible to efficiently suppress adhesion of liquid components on the nozzle surface 41A, while suppressing excessive drying of the nozzle surface 41A.

Additionally, as described above, the printing method of the present exemplary embodiment is a printing method by the printing apparatus 1. Here, the printing apparatus 1 includes the platen 46 that supports a recording medium. Additionally, the printing apparatus 1 includes the printing head 41 that reciprocates along the platen 46, and in at least a forward route or a backward route of reciprocation, discharges a droplet onto the printing medium S supported by the platen 46, to perform printing. In the printing method, the airflow A1 is blown to the nozzle surface 41A of the printing head 41 that reciprocates during printing, on at least one of two sides of the platen 46 in the X-axis direction, which is a direction in which the printing head 41 moves along with the reciprocation.

Therefore, it is possible to promote evaporation of liquid components of ink adhering to the nozzle surface 41A without interruption of printing. Thus, occurrence and progression of condensation at the nozzle surface 41A can be suppressed, and good print quality can be stably obtained even in continuous printing for a long period of time. In particular, since a simple configuration is adopted in which the airflow A1 is blown to the nozzle surface 41A with respect to a position where the printing head 41 moves, there is no need for complex structure or a mechanism. In addition, during operation of printing a series of frames, the airflow A1 can be blown to the nozzle surface 41A, and good printing quality can be obtained while ensuring productivity.

In the present exemplary embodiment, the airflow A1 is blown in accordance with an environmental temperature at the start of printing by the printing head 41.

Therefore, since the airflow is blown to the nozzle surface 41A based on the environmental temperature, it is possible to efficiently suppress adhesion of liquid components on the nozzle surface 41A, while suppressing excessive drying of the nozzle surface 41A.

In addition, in the present exemplary embodiment, the airflow A1 is blown in accordance with a duty of print data printed by the printing head 41.

Therefore, since the airflow is blown to the nozzle surface 41A based on the duty, it is possible to efficiently suppress condensation of liquid components on the nozzle surface 41A.

8. Other Exemplary Embodiments

The exemplary embodiment described above is merely a specific aspect for implementing the present disclosure described in the claims, and does not limit the present disclosure, and can be implemented in various aspects, for example, as illustrated below, in a range where the gist thereof is not deviated.

Figure 9:
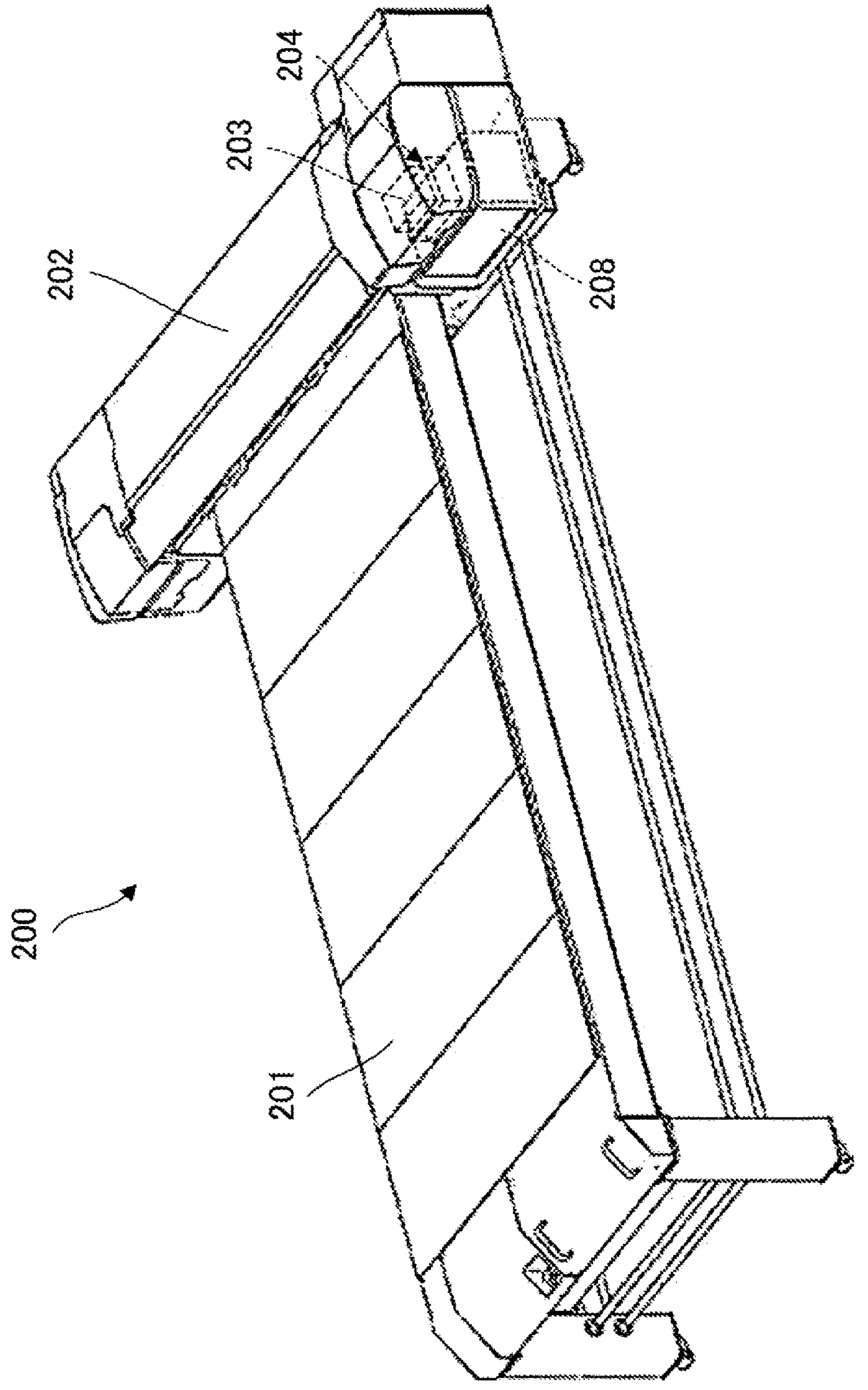
FIG. 9 is a diagram illustrating a printing apparatus according to another exemplary embodiment.

FIG. 9 is a diagram illustrating a printing apparatus 200 according to another exemplary embodiment.

In the exemplary embodiment described above, the case has been described as an example in which the printing apparatus 1 is the lateral type ink jet printer. However, an object to which the present disclosure is applied is not limited to the lateral type ink jet printer. For example, the printing apparatus 200 of a gantry type as illustrated in FIG. 9 may be used.

That is, in FIG. 9, the printing apparatus 200 includes a flatbed 201 disposed on a floor surface. The printing medium S having a predetermined size is placed on the flatbed 201. Above the flatbed 201, a gate-shaped moving unit 202 that straddles the flatbed 201 in a short direction is disposed. In the moving unit 202, a serial type printing head 203 is supported. The printing head 203 is supported by the carriage 204 so as to be capable of reciprocating in the short direction of the flatbed 201 in the moving unit 202. In this state, the moving unit 202 moves in a longitudinal direction of the flatbed 201 along the flatbed 201, and thus an image can be recorded on the printing medium S by the printing head 203.

Here, by providing the moving unit 202 with an air blowing unit 208, it is possible to blow an airflow to a nozzle surface of the printing head 203, when the serial type printing head 203 moves to a non-printing region.

That is, the printing apparatus 200 illustrated in FIG. 9 includes a carriage 204 that reciprocates the printing head 203 in the short direction, and the moving unit 202 that moves the carriage 204 in the longitudinal direction orthogonal to the short direction. The air blowing unit 208 is disposed in the moving unit 202.

The flatbed 201 corresponds to an example of a support portion. The carriage 204 corresponds to an example of a reciprocating unit. The moving unit 202 corresponds to an example of an orthogonal movement unit. The short direction of the flatbed 201 corresponds to an example of a reciprocation direction. The longitudinal direction of the flatbed 201 corresponds to an example of an orthogonal direction.

In the exemplary embodiment described above, the lateral type ink jet printer has been illustrated, but the present disclosure may be applied to a serial type ink jet printer.

In the exemplary embodiment described above, the air blowing unit 8 is provided only on the second side of the two sides of the platen 46 in the X-axis direction, but the air blowing unit 8 may be provided on both the sides of the first side and the second side.

In the exemplary embodiment described above, the configuration has been described in which, the air blowing unit 8 determines whether an environmental temperature is less than only one predetermined threshold value or not and drives the blower fan 81, but a configuration may be adopted in which, for example, by setting a plurality of threshold values, the number of rotations of the blower fan is changed, in accordance with temperature. In other words, the fan control unit 135 may increase the number of rotations of the fan as the temperature lowers. Similarly, the fan control unit 135 may increase the number of rotations of the fan as a duty increases.

In the exemplary embodiment described above, the configuration has been described in which, the fan control unit 135 controls the blower fan 81 based on temperature and a duty, but the control unit 135 may control the blower fan 81 based only on temperature, or may control the blower fan 81 based only on a duty.

In the exemplary embodiment described above, the configuration has been described in which, the air blowing unit 8 guides an airflow blown out from the blower fan 81 using the duct 85. However, for example, a configuration may be adopted in which, a line flow fan (registered trademark) that is longer than the platen 46 is used to blow an airflow directly from an air outlet toward the nozzle surface 41A.

In the exemplary embodiment described above, the configuration has been described in which, in the air blowing unit 8, the upper surface of the duct 85 is disposed parallel to the nozzle surface 41A, and the airflow A1 is blown in a direction orthogonal to the nozzle surface 41A. However, as indicated by the two-dot chain lines in FIG. 5, the configuration may be adopted in which, in the air blowing unit 8, the upper surface of the duct 85 is inclined, and the airflow A1 is blown from a direction inclined with respect to the nozzle surface 41A to the nozzle surface 41A.

Also, the functional block explained using the figure is a schematic diagram in which the functional configurations of the respective devices are classified and illustrated in accordance with the main processing contents, in order to facilitate understanding of the present disclosure. The configurations of the respective devices can also be classified into more components depending on the processing contents. Also, one component can be classified to perform more processes. Further, the processing of each component may be performed with one piece of hardware, or may be performed with a plurality of pieces of hardware. Further, the processing of each component may be realized with one program, or may be implemented with a plurality of programs.

Further, the processing units in the flowchart illustrated in the figure are divisions based on the main processing contents in order to facilitate the understanding of the processing of each device. The present disclosure is not limited by the way of dividing the processing units or the names. The processing of each device can be divided into more processing units depending on the processing contents. Also, one processing unit can be divided to include more processes. Additionally, the processing order in the above-described flowchart is also not limited to the illustrated example, as long as similar processing can be performed.

What is claimed is:

1. A printing apparatus, comprising:

a support portion configured to support a recording medium;

a printing head configured to reciprocate along the support portion, and discharge a droplet onto the recording medium supported by the support portion at least in a forward route or backward route of the reciprocation, to perform printing; and an air blowing unit disposed on at least one of two sides of the support portion in a reciprocation direction, that is a direction in which the printing head moves along with the reciprocation, and configured to blow an airflow to a nozzle surface of the printing head that performs the reciprocation, wherein an air blowing port of the air blowing unit is disposed at a position where the printing head stops when a movement direction of the printing head in the reciprocation is switched, in the reciprocation direction, and the air blowing port is disposed at a position facing the printing head.

2. The printing apparatus according to claim 1, wherein the support portion includes a heating unit configured to heat the recording medium from a surface side opposite to a side of the recording medium onto which the droplet is discharged.

3. The printing apparatus according to claim 1, wherein the air blowing unit is disposed on only one side of the support portion in the reciprocation direction, and a flushing mechanism configured to flush the printing head is disposed on another side of the support portion in the reciprocation direction.

4. The printing apparatus according to claim 1, comprising:

a transport unit configured to transport the recording medium in the reciprocation direction; and a transport direction changing unit disposed between the support portion and the air blowing unit in the reciprocation direction, and configured to change a transport direction of the recording medium to a direction in which the recording medium does not block an airflow blown by the air blowing unit.

5. The printing apparatus according to claim 1, further comprising:

a reciprocating unit configured to move the printing head in the reciprocation direction; and an orthogonal movement unit configured to move the reciprocating unit in an orthogonal direction orthogonal to the reciprocation direction, wherein the air blowing unit is disposed in the orthogonal movement unit.

6. The printing apparatus according to claim 1, comprising:

a control unit, wherein the control unit controls the air blowing unit in accordance with an environmental temperature at the start of printing.

7. The printing apparatus according to claim 1, comprising a control unit configured to cause the printing head to perform printing based on print data, wherein the control unit controls the air blowing unit in accordance with a duty of the print data.

8. A printing method by a printing apparatus including a support portion supporting a recording medium, a printing head reciprocating along the support portion, and discharging a droplet onto the recording medium supported by the support portion at least in a forward route or backward route of the reciprocation, to perform printing, an air blowing unit disposed on at least one of two sides of the support portion in a reciprocation direction, that is a direction in which the printing head moves along with the reciprocation, and blow an airflow to a nozzle surface of the printing head that performs the reciprocation, the printing method comprising:

on at least one of two sides of the support portion in a reciprocation direction that is a direction in which the printing head moves along with the reciprocation, blowing an airflow to a nozzle surface of the printing head that performs the reciprocation during printing, wherein an air blowing port of the air blowing unit is disposed at a position where the printing head stops when a movement direction of the printing head in the reciprocation is switched, in the reciprocation direction, and the air blowing port is disposed at a position facing the printing head.

9. The printing method according to claim 8, wherein the airflow is blown in accordance with an environmental temperature at the start of printing by the printing head.

10. The printing method according to claim 8, wherein the airflow is blown in accordance with a duty of print data printed by the printing head.

* * * * *